United States Patent
Kameyama et al.

(10) Patent No.: US 7,046,319 B2
(45) Date of Patent: May 16, 2006

(54) POLARIZING MEMBER, OPTICAL MEMBER AND LIQUID-CRYSTAL DISPLAY DEVICE

(75) Inventors: Tadayuki Kameyama, Osaka (JP); Hironori Motomura, Osaka (JP)

(73) Assignee: Nitto Denko Corporation, Ibaraki (JP)

( * ) Notice: Subject to any disclaimer, the term of this patent is extended or adjusted under 35 U.S.C. 154(b) by 115 days.

(21) Appl. No.: 09/929,063

(22) Filed: Aug. 15, 2001

(65) Prior Publication Data
US 2002/0015120 A1   Feb. 7, 2002

(30) Foreign Application Priority Data
Feb. 8, 1999   (JP) ................. 11-029795

(51) Int. Cl.
*G02F 1/1335*   (2006.01)
(52) U.S. Cl. ......................... 349/96; 438/437
(58) Field of Classification Search ........... 349/96; 359/437
See application file for complete search history.

(56) References Cited

U.S. PATENT DOCUMENTS

| | | | | |
|---|---|---|---|---|
| 5,048,933 A | * | 9/1991 | Asano | 349/61 |
| 5,784,141 A | * | 7/1998 | Chen et al. | 349/191 |
| 5,825,444 A | * | 10/1998 | Broer et al. | 349/98 |
| 5,880,800 A | * | 3/1999 | Mikura et al. | 349/122 |
| 6,111,633 A | * | 8/2000 | Albert et al. | 349/196 |
| 6,153,272 A | * | 11/2000 | Kim et al. | 428/1.5 |
| 6,379,758 B1 | * | 4/2002 | Hanmer et al. | 428/1.1 |
| 6,433,853 B1 | * | 8/2002 | Kameyama et al. | 349/176 |

FOREIGN PATENT DOCUMENTS

| | | |
|---|---|---|
| JP | 2000-137115 | 5/2000 |
| JP | 2000-313766 | 11/2000 |
| JP | 2000-314811 | 11/2000 |
| JP | 2001-151901 | 5/2001 |

OTHER PUBLICATIONS

Kotz et al. Chemistry and Chemical Reactivity, second edition, 1991, Sauders College Publishing, pp. 166.*
Abstract 2000-314811.
Abstract 2000-137115.
Abstract 2000-313766.

* cited by examiner

*Primary Examiner*—Jennifer Kennedy
(74) *Attorney, Agent, or Firm*—Westman, Hattori, Daniels & Adrian LLP

(57) ABSTRACT

A polarizing member is constituted by an absorption type polarizing film, and one polymer material layer or two or more polymer material layers provided on one or both of opposite surfaces of the absorption type polarizing film, wherein each polymer material layer does not have any extra ordinary refractive index area with a length not smaller than 20 μm and does not have two or more extraordinary refractive index areas with a length of from 0.5 to 20 μm in a region of 50 μm-radius. An optical member is constituted by a laminate at least having the polarizing member, and a reflection type polarizing plate. A liquid-crystal display device is constituted by either of the polarizing member and the optical member, and a liquid-crystal cell, wherein either of the polarizing member and the optical member is provided on one or both of opposite sides of the liquid-crystal cell.

22 Claims, 1 Drawing Sheet

POLARIZING MEMBER, OPTICAL MEMBER AND LIQUID-CRYSTAL DISPLAY DEVICE

BACKGROUND OF THE INVENTION

1. Field of the Invention

The present invention relates to a polarizing member and an optical member which can prevent optical extraordinariness such as bright spots from occurring in a high-luminance liquid-crystal display device.

2. Description of the Related Art

With the advance of making the luminance high because of popularization of a monitor of a liquid-crystal display device, anon-vehicle television or navigator, or the like, there arises a problem that optical extraordinariness such as bright spots occurs in black display though the optical extraordinariness has never occurred at front luminance of about 150 cd/m$^2$ at the highest. Incidentally, in a light source system, or the like, in which luminance is made higher by increasing the quantity of light allowed to be transmitted through the absorption type polarizing plate by use of a reflection type polarizing plate made of a cholesteric liquid-crystal layer or the like, the luminance can be generally increased by 1.2–1.6 times.

Similarly to the above problem of occurrence of optical extraordinariness due to making the luminance high, a problem also occurs when the contrast is made high. That is, in an STN mode or a TN mode in a notebook-sized personal computer or the like, the contrast ratio is generally set to be in a range of from 30:1 to 100:1 in the conventional case. As the contrast for a monitor or the like, a high contrast ratio in a range of from 300:1 to 500:1 is requested, and in such a case, the problem of bright spots in black display impedes the achievement of the high contrast ratio.

SUMMARY OF THE INVENTION

An object of the present invention is to develop a polarizing member and optical member which can prevent optical extraordinariness such as bright spots from occurring in a liquid-crystal display device, or the like, which achieves high luminance by use of a reflection type polarizing plate, or the like.

In order to achieve the above object, according to the present invention, there is provided a polarizing member constituted by an absorption type polarizing film, and one polymer material layer or two or more polymer material layers provided on one or both of opposite surfaces of the absorption type polarizing film, wherein each polymer material layer does not have any extraordinary refractive index area with a length not smaller than 20 μm and does not have two or more extraordinary refractive index areas with a length of from 0.5 to 20 μm in a region of 50 μm-radius. There is also provided an optical member constituted by a laminate at least having the polarizing member, and a reflection type polarizing plate. There is further provided a liquid-crystal display device constituted by either of the polarizing member and the optical member, and a liquid-crystal cell, wherein either of the polarizing member and the optical member is disposed on one or both of opposite sides of the liquid-crystal cell.

According to the present invention, it is possible to obtain a polarizing member and an optical member which can prevent optical extraordinariness such as bright spots in black display from occurring in a liquid-crystal display device, or the like, that achieves high luminance by use of a reflection type polarizing plate, or the like. By using these members, it is possible to form a high-luminance and high-contrast liquid-crystal display device excellent in visibility. This is because these members satisfy the above-mentioned condition of extraordinary refractive index areas.

That is, in order to overcome the problem of optical extraordinariness such as bright spots, the inventors of the present application have made researches diligently into various members constituting the foregoing polarizing members such as polarizing plates. As a result of the researches, it has been found that the problem of occurrence of such bright spots is a problem peculiar to the optical use of the polarizing members occurring in the extraordinary refractive index area due to transparent crystal generated in the polarizing members, and, generally, a polymer material contains the extraordinary refractive index area which is formed because of crystallization of low molecular weight components such as oligomer or the like.

Incidentally, a polarizing member is formed in such a manner that one polymer material layer or two or more polymer material layers are provided on one or both of opposite surfaces of an absorption type polarizing film. Each polymer material layer is selected from a transparent protective layer, an adhesive layer, an optically compensating layer, or the like. Although the transparent protective layer is made from cellulose triacetate, the transparent protective layer generally contains non-acetylated cellulose triacetate, or the like, as transparent crystal. In the adhesive layer, low molecular weight components such as oligomer, or the like, in a separator for temporarily covering the adhesive layer migrate to the adhesive layer so as to precipitate as transparent crystal. According to the present invention, such an extraordinary refractive index area due to transparent crystal is eliminated as much as possible. Thus, the operation and effects of the present invention can be achieved.

Features and advantages of the invention will be evident from the following detailed description of the preferred embodiments described in conjunction with the attached drawings.

DETAILED DESCRIPTION OF THE PREFERRED EMBODIMENTS

Figure 1:
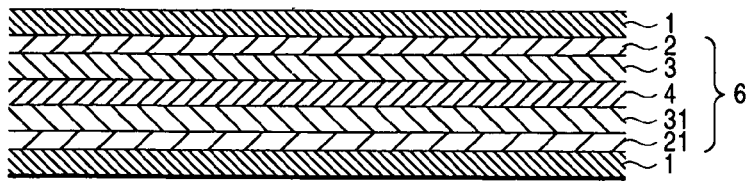
FIG. 1 is a sectional view showing an example of a polarizing member.
Figure 2:
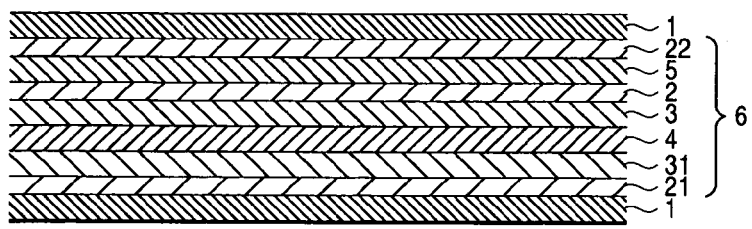
FIG. 2 is a sectional view showing another example of the polarizing member.

According to the present invention, a polarizing member is constituted by an absorption type polarizing film, and one polymer material layer or two or more polymer material layers provided on one or both of opposite surfaces of the absorption type polarizing film, wherein each polymer material layer does not have any extraordinary refractive index area with a length not smaller than 20 μm and does not have two or more extraordinary refractive index areas with a length of from 0.5 to 20 μm in a region of 50 μm-radius. FIGS. 1 and 2 show examples of the polarizing member. The polarizing member 6 shown in FIG. 1 has adhesive layers 2 and 21, transparent protective layers 3 and 31, and a polarizing film 4. The polarizing member 6 shown in FIG. 2 has adhesive layers 2, 21 and 22, transparent protective layers 3 and 31, a polarizing film 4, and an optically compensating layer 5. The adhesive layers, the transparent protective layers and the optically compensating layer constitute polymer material layers respectively. The reference numeral 1 designates a separator.

As the absorption type polarizing film, it is possible to use a suitable one that transmits linear polarized light with a predetermined axis of polarization while absorbing the residual light. There is no particular limit in kind of the absorption type polarizing film. Examples of the preferred absorption type polarizing film may include: a polarizing film obtained by orienting a hydrophilic high-molecular film such as a polyvinyl alcohol film, a partially formalized polyvinyl alcohol film or a partially saponified ethylene-vinyl acetate copolymer film while making the hydrophilic high-molecular film adsorb iodine and/or dichromatic dye; a polyene-aligned film such as polyvinyl alcohol dehydrate or polyvinyl chloride dehydrochlorinate; and soon. Although the thickness of the polarizing film is generally in a range of from 5 to 80 μm, the present invention is not limited thereto.

Also as a raw material for forming the polymer material layer, it is possible to use a suitable one that can be used for formation of a liquid-crystal display device, such as a transparent protective layer, an adhesive layer, an optically compensating layer, and so on. The polarizing member may be configured so that one polymer material layer or two or more polymer material layers of one kind or of different kinds are provided on one or both of opposite surfaces of the absorption type polarizing film.

The transparent protective layer is provided on either or each of opposite surfaces of the polarizing film for the purpose of protection such as improvement of water resistance, reinforcement, and so on, as occasion demands. A polymer excellent in transparency, mechanical strength, thermal stability, moisture sealability, and so on, is preferably used for the formation of the transparent protective layer. Examples of the preferred polymer may include: cellulose polymers such as cellulose diacetate or celllulose triacetate; polyester polymers such as polyethylene terephthalate or polyethylene naphthalate; polyether sulfone or polycarbonate, polyamide or polyimide; polyolefin or acrylic resin; acrylic, urethane, acrylic urethane, epoxy or silicone heat-curable or ultraviolet-curable resins; and so on.

The transparent protective layer can be formed by a suitable system such as a system of applying a polymer solution, a system of adhesively laminating a film, or the like. The thickness of the transparent protective layer can be determined suitably and is generally selected to be not larger than 500 μm especially in a range of from 1 to 300 μm, further especially in a range of from 5 to 200 μm.

If it is necessary, the adhesive layer is provided for the purpose of bonding the polymer material, or the like. For the formation of the adhesive layer, there can be used an adhesive material or an adhesive agent which contains, as a base polymer, a suitable polymer such as an acrylic polymer or a silicone polymer, polyester or polyurethane, polyether or synthetic rubber, etc. Especially, the preferred is a material such as an acrylic adhesive agent excellent in optical transparency, exhibiting moderate adhesive characteristic such as wettability, coherence, adherence, etc., and excellent in weather resistance, heat resistance, etc., in which there is no problem of peel such as floating, peeling, or the like, under the condition of heating or humidification.

An example of the acrylic adhesive agent is an adhesive agent containing an acrylic polymer with a weight average molecular weight of not lower than 100,000 as a base polymer, the acrylic polymer being prepared by copolymerization of a combination of (meth)acrylic acid alkyl ester containing analkyl group having 20 or less carbon atoms, such as a methyl group, an ethyl group, a butyl group, or the like; and an acrylic monomer constituted by a modified component of (meth)acrylic acid, (meth)acrylic acid hydroxyethyl, or the like, with the glass transition temperature made not higher than 0° C. However, the acrylic adhesive agent is not limited to this example.

The adhesive layer may be provided on either or each of opposite surfaces of the polymer material so that the adhesive layer can be used for a bonding process. The adhesive layer may be provided as a multilayer of different compositions or different kinds. When adhesive layers are provided on opposite surfaces of the polymer material, the front side adhesive layer may be different in composition or kind from the back side tack layer.

The adhesive layer can be attached to the polymer material by a suitable system. Examples of the system may include: a system of attaching an adhesive agent solution directly onto a polymer material by a suitable development system such as a casting system, a coating system, or the like, after dissolving or dispersing an adhesive material or a composition thereof in a single or mixture solvent composed of at least one suitable solvent such as toluene, ethyl acetate, etc. to prepare 10 to 40% by weight of the adhesive agent solution; a system of transferring an adhesive layer onto a polymer material after forming the adhesive layer on a separator in accordance with the above description; and so on.

The thickness of the adhesive layer can be determined suitably in accordance with the adhesive force, or the like, and is generally set to be in a range of from 1 to 500 μm. In order to bond the polarizing member to a liquid-crystal cell or the like as shown in FIGS. 1 and 2, the adhesive layer may be provided on the outer surface of the polarizing member in accordance with the necessity. When the surfaces of the adhesive layers 2 and 21 are to be exposed, the surfaces maybe preferably covered with separators 1 or the like as shown in FIGS. 1 and 2 until the adhesive layers are put into practical use.

Incidentally, the adhesive layer may contain suitable additives such as a filler or pigment constituted by natural or synthetic resins, especially adhesiveness-donating resins, glass fiber or glass beads, metal powder or other inorganic powder, and so on; a coloring agent or an anti-oxidant, etc. as occasion demands. The adhesive layer may also contain fine particles so as to exhibit light-diffusing characteristic.

On the other hand, the optically compensating layer may be used in accordance with the necessity for compensating for retardation due to the liquid-crystal cell, or the like. Examples of the optically compensating layer may include: a birefringent film constituted by an oriented film of any kind of polymer; an alignment film of a liquid-crystal polymer such as a discotic liquid-crystal polymer or a nematic liquid-crystal polymer; a film having the aligned liquid-crystal layer supported on a film base material; and so on. In this case, a material excellent in isotropy such as a cellulose film may be preferably used as the film base material supporting the aligned liquid-crystal layer.

Examples of the polymer for forming the birefringent film may include: polyethylene or polypropylene; olefin polymer such as polyolefin having a norbornene structure; polyester polymer; acrylic polymer such as polymethyl methacrylate, or cellulose polymer; polyamide or polyimide; polysulfone or polyether-sulfone; polyether-ether-ketone or polyphenylene sulfide; polyvinyl alcohol or polyvinyl chloride; polyvinyl butylate or polycarbonate; polystylene or polyallylate; polyoxymethylene; and so on.

Especially, polymer excellent in crystallinity such as polyester polymer or polyether-ether-ketone can be used preferably. The oriented film maybe a film treated by a suitable system such as monoaxial orientation, biaxial orientation, or the like. The birefringent film may be a film in which the refractive index in the direction of the thickness of the film is controlled by a system of donating shrinking force or/and orienting force under adhesion to a heat-shrinkable film. The optically compensating layer may be constituted by a laminate of two or more retardation layers in order to control optical characteristic such as retardation.

Each of the polymer material layers in the present invention is provided as a layer which does not have any extraordinary refractive index area with a length not smaller than 20 μm and does not have two or more extraordinary refractive index areas with a length of from 0.5 to 20 μm in a region of 50 μm-radius. The polymer material layers are laminated onto the absorption type polarizing film. Hence, optical extraordinariness such as bright spots can be prevented in black display even in the case where the present invention is applied to a liquid-crystal display device, or the like, with high luminance achieved by use of a reflection type polarizing plate as occasion demands.

In use of a polymer material layer having at least one extraordinary refractive index area with a length not smaller than 20 μm or in use of a polymer material layer having at least two extraordinary refractive index areas with a length of from 0.5 to 20 μm in a region of 50 μm-radius, it is impossible to prevent optical extraordinariness such as bright spots from occurring under a high luminance, for example, under a luminance exceeding 5,000 cd/m$^2$.

Under a luminance of about 150 cd/m$^2$ or lower as in the background art, bright spots or the like do not appear even in the case where there is some extraordinary refractive index area with a size of from about 70 to about 100 μm. Under a luminance of about 200 cd/m$^2$, however, bright spots appear. Even in the case where bright spots do not occur under 200 cd/m$^2$, bright spots may appear under a luminance of 500 cd/m$^2$ or higher. In this case, the presence of a smaller extraordinary refractive index area is a cause of occurrence of bright spots.

As the luminance increases, the extraordinary refractive index area which is a cause of occurrence of bright spots decreases in size. For this reason or the like, it is conceived that the phenomenon of occurrence of bright spots or the like is based on light scattering through the extraordinary refractive index area, and that optical extraordinariness such as bright spots will occur because the light-emitting region becomes large with the increase of the intensity of scattering light due to high luminance even in the case where the extraordinary refractive index area is small.

As described above, the polymer material in the present invention is a material in which the extraordinary refractive index area which is a cause of bright spots or the like has been removed. For example, the polymer material can be obtained by a system in which: a polymer for forming the polymer material is prepared in the form of a polymer solution; the polymer solution is filtrated by a filtration film to thereby purify the polymer in a state in which low molecular weight bodies such as non-acetylate, oligomer, and so on, have been removed; and a film is made from the purified polymer as a raw material.

Incidentally, in the case where the transparent protective layer is composed of cellulose triacetate, the film can be formed as follows. The material of cellulose triacetate commercially available is dissolved in methylene chloride or the like to prepare a cellulose acetate solution. The solution is filtrated under atmospheric pressure or the like by a 10 μm-pore filtration film composed of polytetrafluoroethylene which is treated so as to be made hydrophilic. A film is made from the purified polymer. A transparent protective layer, or the like, satisfying the aforementioned extraordinary refractive index area condition can be formed by use of the film obtained in the aforementioned manner.

Also the optically compensating layer can be obtained by use of a polymer which is purified in accordance with the aforementioned manner. When the optically compensating layer is provided as an oriented film, it is preferable that improvement of filtration accuracy is attained by a system using a filtration film, for example, with a pore size of from 0.5 to 10 μm. This is based on the fact that the extraordinary refractive index area is assumed to be widened by the orientation process. Therefore, when, for example, the orientation process is to be performed to orient the film twice, it is preferable that the film is purified by a filtration film with a pore size of not larger than 5 μm (10 μm/2).

On the other hand, prevention of the polymer base material components from migrating from the separator to the adhesive layer is important for satisfying the aforementioned extraordinary refractive index area condition. For example, the prevention of migration can be achieved by a system using a separator made of a polymer purified in accordance with the above description. Alternatively, the prevention of migration can be achieved by a system in which: a migration preventing layer made of a silica film, a metal oxide-deposited film, or the like, is provided on a polymer base material for forming a separator; and a surface coat made of a release agent such as a silicone release agent is provided on the migration preventing layer to thereby block the migration of the polymer base material components from the separator to the adhesive layer.

Figure 3:
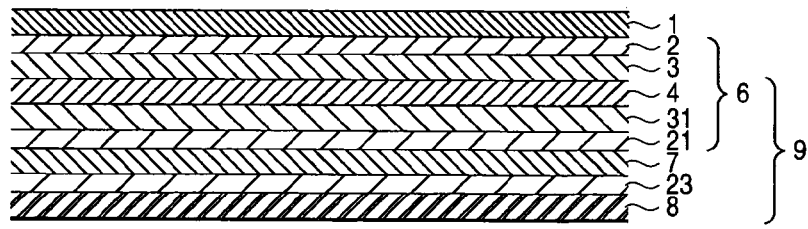
FIG. 3 is a sectional view showing an example of an optical member.

The polarizing member according to the present invention may be laminated on one suitable optical layer or two or more suitable optical layers such as a reflection type polarizing plate, as occasion demands, to thereby form an optical member. Accordingly, the optical member laminated thus can be put into practical use. FIG. 3 shows an example of the optical member. The optical member 9 is configured in such a manner that a retarder plate 7 is bonded to the polarizing member 6 through the adhesive layer 21 provided on the polarizing member 6 and a reflection type polarizing plate 8 is bonded to the outer side of the retarder plate 7 through an adhesive layer 23.

When natural light is incident on the reflection type polarizing plate, the reflection type polarizing plate exhibits characteristic of reflecting linearly polarized light with a predetermined axis of polarization or circularly polarized light in a predetermined direction while transmitting the residual light. The reflection type polarizing plate is also called polarization separating plate, or the like. Light from a light source such as a backlight is made to be incident on the reflection type polarizing plate, so that light transmitted through the reflection type polarizing plate is obtained in a predetermined state of polarization. Light reflected by the reflection type polarizing plate is inverted through the reflection layer or the like, so that the light is made to be incident on the reflection type polarizing plate again. As a result, the reflection type polarizing plate transmits the light partially or wholly as light in a predetermined state of polarization. Hence, the increase of the quantity of light transmitted through the reflection type polarizing plate is attained. At the same time, polarized light hardly absorbed to the absorption type polarizing plate is supplied to attain the increase of the quantity of light allowed to be used for liquid-crystal display or the like to thereby improve luminance.

Therefore, a suitable plate, such as a plate exhibiting characteristic of transmitting linearly polarized light with a predetermined axis of polarization while reflecting the residual light or a plate exhibiting characteristic of reflecting circularly polarized light in one of left and right directions while transmitting the residual light, can be used as the reflection type polarizing plate. Examples of the former plate may include: a multilayer dielectric thin film; and a multilayer laminate of thin films different in refractive-index anisotropy. Examples of the latter plate may include: a cholesteric liquid-crystal layer, especially an alignment film of a cholesteric liquid-crystal polymer; and a film of the aligned liquid-crystal layer supported on a film base material.

Hence, in the reflection type polarizing plate of the type of transmitting linearly polarized light with a predetermined axis of polarization, the transmitted light is made to be incident on the absorption type polarizing plate directly with the axis of polarization trued up, so that the light can be transmitted through the absorption type polarizing plate efficiently while absorption loss due to the absorption type polarizing plate is suppressed.

On the other hand, in the reflection type polarizing plate of the type of transmitting circularly polarized light such as a cholesteric liquid-crystal layer, the light can be made to be incident on the absorption type polarizing plate directly but it is preferable from the point of view of suppression of absorption loss that the circularly polarized light transmitted through the reflection type polarizing plate is converted into linearly polarized light through the retarder plate 7 before the light is made to be incident on the absorption type polarizing plate as shown in FIG. 3. Incidentally, use of a quarter-wave plate as the retarder plate makes it possible to convert the circularly polarized light into linearly polarized light.

For example, the retarder plate functioning as a quarter-wave plate in a wide wavelength range such as a visible light range can be obtained by a system in which a retardation layer functioning as a quarter-wave plate with respect to monochromatic light such as light with a wavelength of 550 nm is superposed on a retardation layer exhibiting another retardation characteristic such as a retardation layer functioning as a half-wave plate. Therefore, the retarder plate disposed between the polarizing member and the reflection type polarizing plate may be constituted by one retardation layer or by two or more retardation layers.

Incidentally, also the cholesteric liquid-crystal layer may be provided as a multilayer having an arrangement structure in which two layers or three or more layers different in reflection wavelength are used in combination so as to be superposed on one another. This structure allows the cholesteric liquid-crystal layer to reflect circularly polarized light in a wide wavelength range such as a visible light range. Accordingly, circularly polarized light transmitted in a wide wavelength range can be obtained.

The polarizing member and the optical member according to the present invention can be used for various kinds of purposes in a liquid-crystal display device, etc. Particularly because these members are excellent in high luminance characteristic, these members can be used preferably for the purpose of obtaining high-luminance illumination light from a light source or the like and for the purpose of achieving high contrast ratio.

Figure 4:
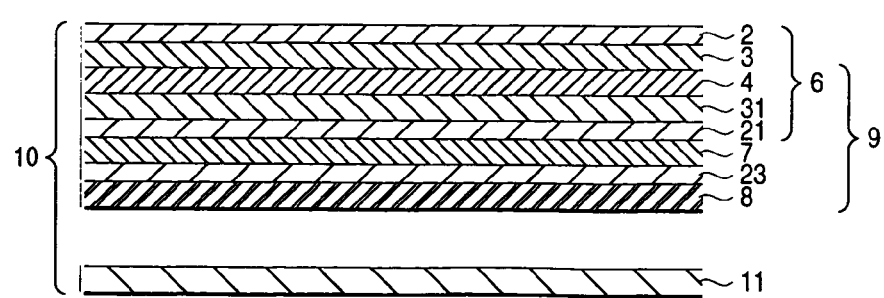
FIG. 4 is a sectional view showing an example of a liquid-crystal display device.

Although the polarizing member can be disposed on either or each of opposite sides of the liquid-crystal cell, the optical member having the reflection type polarizing plate is generally disposed on a side where illumination light from a backlight of the liquid-crystal cell, or the like, is incident. The liquid-crystal cell used is optional. For example, a suitable type liquid-crystal cell such as an active matrix drive type liquid-crystal cell represented by a thin-film transistor type liquid-crystal cell, a passive matrix drive type liquid-crystal cell represented by a twisted nematic type or super-twisted nematic type liquid-crystal cell, or the like, can be used for forming various kinds of liquid-crystal display devices. The polarizing members disposed on the opposite sides of the liquid-crystal cell may be made from one material or from different materials. In FIG. 4, a liquid-crystal device 10 has a liquid-crystal cell 11 and the optical member 9.

The liquid-crystal display device can be formed in accordance with the background-art method without any limitation except that the polarizing member or the optical member according to the present invention is used. Hence, suitable parts such as a prism array sheet, a lens array sheet, a light-diffusing plate, a backlight, and so on, can be disposed as one layer or as two or more layers in suitable positions when the liquid-crystal display device is formed.

EXAMPLE 1

Two 50 μm-thick TAC films made of cellulose triacetate (TD-80U made by Fuji Photo Film Co., Ltd., this applies to the following) which was not purified yet were bonded to opposite surfaces of a polarizing film (HEG1425DU made by Nitto Electric Industrial Co., Ltd., this applies to the following) through polyvinyl alcohol adhesive layers respectively to thereby form a polarizing plate. A quarter-wave plate was bonded to a surface of the polarizing plate through an acrylic adhesive layer 20 μm thick. A reflection type polarizing plate made of a cholesteric liquid-crystal polymer was bonded to the outer side of the quarter-wave plate through an acrylic adhesive layer 20 μm thick. A 25 μm-thick acrylic adhesive layer provided on a separator made of a polyester film surface-treated with a silicone release agent was bonded together with the separator to the other surface of the polarizing plate to obtain an optical member (PCF350-HEG made by Nitto Electric Industrial Co., Ltd.)

EXAMPLE 2

An optical member was obtained in the same manner as in Example 1 except that a film made of a polymer purified by filtration of a solution of cellulose triacetate dissolved in methylene chloride to be made hydrophilic, through a filtration film under atmospheric pressure was used as the TAC film on a side of the polarizing plate where the separator was temporarily attached and that an ITO-deposited film provided on a polyester film and surface-treated with a silicone release agent was used as the separator.

EXAMPLE 3

An optical member was obtained in the same manner as in Example 1 except that DBEF (made by 3M Com.) was used as the reflection type polarizing plate and that the quarter-wave plate and the adhesive layer thereof were omitted.

EXAMPLE 4

An optical member was obtained in the same manner as in Example 2 except that DBEF (made by 3M Com.) was used as the reflection type polarizing plate and that the quarter-wave plate and the adhesive layer thereof were omitted.

Evaluation Test

The optical member obtained in each of Examples 1 to 4 was used as a polarizing plate or the like on the light source side of a normally white TFT type liquid-crystal display device available on the market. A side backlight with a luminance of 1,500 cd/m$^2$ or 5,000 cd/m$^2$ was disposed on the back surface of the reflection type polarizing plate of the optical member. The minimum size (length) of the extraordinary refractive index area observed as bright spots in black display was measured. Incidentally, the optical member was disposed so that the axis of polarization of the polarizing plate was inclined at 135 degrees or at 45 degrees. That is, a normally white type display device and a normally black type display device were formed as two types of liquid-crystal display devices.

Results of the measurement were shown in the following Table.

| Mode<br>Contrast | Normally white<br>120:1 | | Normally black<br>270:1 | |
|---|---|---|---|---|
| Luminance (cd/m$^2$) | 1,500 | 5,000 | 1,500 | 5,000 |
| Example 1 (μm) | 80 | 50 | 50 | 20 |
| Example 2 (μm) | No bright spot | No bright spot | No bright spot | No bright spot |
| Example 3 (μm) | 80 | 50 | 50 | 20 |
| Example 4 (μm) | No bright spot | No bright spot | No bright spot | No bright spot |

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A polarizing member comprising:
an absorption type polarizing film; and
one polymer material layer or two or more polymer material layers provided on one or both of opposite surfaces of said absorption type polarizing film, wherein each polymer material layer does not have any extraordinary refractive index area with a length not smaller than 20 μm and does not have two or more extraordinary refractive index areas with a length of from 0.5 to 20 μm in a region of 50 μm-radius.

2. A polarizing member according to claim 1, wherein each polymer material layer is one member selected from the group consisting of a transparent protective layer, an adhesive layer, and an optically compensating layer.

3. An optical member comprising a laminate at least including a polarizing member defined in claim 1, and a reflection type polarizing plate.

4. An optical member according to claim 3, wherein said reflection type polarizing plate transmits linearly polarized light with a predetermined axis of polarization while reflecting residual light.

5. An optical member according to claim 3, wherein a retarder plate is provided between said polarizing member and said reflection type polarizing plate, said retarder plate being constituted by one retardation layer or two or more retardation layers.

6. An optical member according to claim 3, wherein said reflection type polarizing plate is made of a cholesteric liquid-crystal layer or said retarder plate is made of a quarter-wave plate.

7. A liquid-crystal display device comprising an optical member defined in claim 3, and a liquid-crystal cell, wherein said optical member is disposed on one or both of opposite sides of said liquid-crystal cell.

8. The optical member according to claim 3, wherein the one or more polymer material layers are provided directly on the polarizing film.

9. A liquid-crystal display device comprising a polarizing member defined in claim 1, and a liquid-crystal cell, wherein said polarizing member is disposed on one or both of opposite sides of said liquid-crystal cell.

10. The liquid-crystal display device according to claim 9, which additionally comprises a light source having a luminance of 500 cd/m$^2$ or higher.

11. The liquid-crystal display device according to claim 9, which additionally comprises a back sidelight having a luminance of 500 cd/m$^2$ or higher.

12. The polarizing member according to claim 1, wherein the one or more polymer material layers are provided directly on the polarizing film.

13. A polarizing member comprising:
an absorption type polarizing film; and
one or more polymer material layers provided on one or both of opposite surfaces of said absorption type polarizing film, wherein each polymer material layer comprises a polymer made from a polymer solution which has been filtrated by a filtration film to thereby purify the polymer to a state in which low molecular weight bodies have been removed.

14. The polarizing member according to claim 13, wherein the one or more polymer material layers are protective films provided directly on the polarizing film.

15. A polarizing member comprising, in this order:
(i) an absorption type polarizing film;
(ii) an adhesive layer; and
(iii) a separator comprising a polymer material-containing layer having a polymer material migration preventing layer provided thereon,
wherein the polymer material migration preventing layer is provided on the side of the polymer material-containing layer that faces the adhesive layer.

16. The polarizing member according to claim 15, wherein the migration preventing layer comprises purified polymer.

17. The polarizing member according to claim 15, wherein the migration preventing layer is a silica film.

18. The polarizing member according to claim 15, wherein the migration preventing layer is a metal-oxide deposited film.

19. The polarizing member according to claim 15, wherein the migration preventing layer comprises a silicone agent.

20. The polarizing member according to claim 15, wherein the polymer material-containing layer is disposed directly on the migration preventing layer.

21. The polarizing member according to claim 15, wherein a release agent is further provided on the polymer material-containing layer of the separator.

22. The polarizing member according to claim 21, wherein a surface coat made of the release agent is provided on the migration preventing layer.

* * * * *